United States Patent [19]

Jones et al.

[11] Patent Number: 5,521,128
[45] Date of Patent: May 28, 1996

[54] NEUTRAL GRAY ABSORBING GLASS COMPRISING MANGANESE OXIDE FOR SELENIUM RETENTION DURING PROCESSING

[75] Inventors: James V. Jones, Toledo, Ohio; Edward N. Boulos, Troy, Mich.

[73] Assignee: Ford Motor Company, Dearborn, Mich.

[21] Appl. No.: 296,639

[22] Filed: Aug. 26, 1994

Related U.S. Application Data

[62] Division of Ser. No. 168,347, Dec. 17, 1993, Pat. No. 5,346,867.

[51] Int. Cl.⁶ .................................................. C03C 1/00
[52] U.S. Cl. .......................... 501/27; 501/31; 501/71
[58] Field of Search .............................. 501/27, 31, 71

[56] References Cited

U.S. PATENT DOCUMENTS

| | | | |
|---|---|---|---|
| Re. 25,312 | 1/1963 | Duncan et al. | 501/71 |
| Re. 35,760 | 10/1994 | Boulos et al. | 501/71 |
| 2,394,493 | 2/1946 | Schoenlaub | 501/71 |
| 2,755,212 | 7/1956 | Brown | 501/31 |
| 2,955,948 | 10/1960 | Silverman | 501/27 |
| 3,296,004 | 1/1967 | Duncan | 501/71 |
| 3,300,323 | 1/1967 | Plumat et al. | 501/71 |
| 3,351,475 | 11/1967 | Hagedorn | 501/71 |
| 3,723,142 | 3/1973 | Kato et al. | 501/71 |
| 3,844,796 | 10/1974 | Jasinski | 501/70 |
| 3,904,425 | 9/1975 | Young et al. | 501/71 |
| 3,915,722 | 10/1975 | Schaller | 501/57 |
| 3,928,050 | 12/1975 | Jasinski | 501/71 |
| 4,104,076 | 8/1978 | Pons | 501/66 |
| 4,235,634 | 11/1980 | Boyd et al. | 501/70 |
| 4,339,541 | 7/1982 | Dela Ruye | 501/71 |
| 4,792,536 | 12/1988 | Pecoraro et al. | 501/70 |
| 4,873,206 | 10/1989 | Jones | 501/71 |
| 5,023,210 | 6/1991 | Krumwiede et al. | 501/71 |
| 5,030,593 | 7/1991 | Heithoff | 501/72 |
| 5,070,048 | 12/1991 | Boulos et al. | 501/71 |
| 5,112,778 | 5/1992 | Cheng et al. | 501/31 |
| 5,212,122 | 5/1993 | Pannhorst et al. | 501/69 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,318,931 | 6/1994 | Nakauchi et al. | 501/64 |

FOREIGN PATENT DOCUMENTS

| | | |
|---|---|---|
| 0349909A1 | 10/1990 | European Pat. Off. . |
| 0482535A1 | 4/1992 | European Pat. Off. . |
| 0536049A1 | 4/1993 | European Pat. Off. . |
| 2082647 | 12/1971 | France ................... 501/70 |
| 1041579 | 9/1981 | Japan ..................... 501/71 |
| 0739014 | 6/1980 | U.S.S.R. ................ 501/71 |
| 0739013 | 6/1980 | U.S.S.R. ................ 501/71 |
| 1331492 | 9/1973 | United Kingdom .... 501/71 |
| 2162835A | 2/1986 | United Kingdom . |

OTHER PUBLICATIONS

Chemical Abstracts, vol. 106, No. 12, Mar. 23, 1987, Columbus, Ohio, U.S.; abstract no. 89151c, G. I. Artamonova et al, "glass", p. 289, see abstract & SU,A,1,270, 133, Nov. 15, 1986.

Database WPI, Week 7721, Derwent Publications Ltd., London, GB; AN 77-37284Y & JP,A,52,047,811 (Shin Nippon Glass) Apr. 16, 1977; see abstract.

*Primary Examiner*—Mark L. Bell
*Assistant Examiner*—David Sample
*Attorney, Agent, or Firm*—Lorraine S. Melotik; Roger L. May

[57] ABSTRACT

A neutral gray, heat absorbing soda-lime-silica glass having at 4 mm. control thickness a light transmittance using illuminant A of 10.0% to 55.0%, ultra violet transmittance less than 25.0%, and infra red transmittance is less than about 50.0% produced with colorants consisting of 0.90 to 1.90 percent by weight total iron oxide as $Fe_2O_3$, 0.002 to 0.025 percent Co, 0.0010 to 0.0060 percent Se, 0.10 to 1.0 percent $MnO_2$, and 0 to 1.0 percent $TiO_2$. The flat glass products having such a composition is particularly suitable for use as a privacy glass or sun roof product in trucks and automobiles.

14 Claims, No Drawings

NEUTRAL GRAY ABSORBING GLASS COMPRISING MANGANESE OXIDE FOR SELENIUM RETENTION DURING PROCESSING

This is a divisional of application Ser. No. 08/168,347 filed Dec. 17, 1993, now U.S. Pat. No. 5,346,867.

BACKGROUND OF THE INVENTION

This invention is directed to a heat absorbing, neutral gray colored glass composition. More particularly, it comprises soda-lime-silica glass whose coloring components consist essentially of iron oxide, cobalt, selenium, manganese dioxide, and optionally titanium dioxide.

Glass having a neutral gray color and properties such as low infra red transmittance and low total solar energy transmittance which reduce the heat gain in the interior of an enclosure is highly desired in the automotive field. The neutral gray color is chosen for the sake of coordinating with a wide range of automotive paint colors. To be particularly useful in the automotive field, the glass composition should be one that is compatible with flat glass manufacturing methods. A glass composition having these properties would be highly desirable, particularly for automotive privacy and sun roof applications.

Some other heat absorbing gray glass compositions contain selenium as an essential coloring component. For example, U.S. Pat. No. 4,873,206 to Jones discloses a gray glass composition which includes as the colorants only iron, cobalt, and selenium. Selenium is a relatively low melting component with a melting point of 217° C. and a boiling point of 685° C. which typically leads to a volatilization of 85% or more of the selenium from the glass batch during glass melting and processing. Selenium is a very expensive material and hence its emission during glass melting is less than desirable. This high level of volatilization takes place even though glass manufacturers typically use sodium or potassium nitrates in the glass composition in an attempt to retain more of the selenium in the glass product.

The present invention overcomes problems associated with selenium vaporization by incorporating manganese oxide into a grey glass composition along with the selenium. We have unexpectedly found that incorporating the manganese oxide into a selenium containing glass composition aids in selenium retention during melt processing.

In addition, contrary to the suggestion of Jones in the patent listed above, including manganese oxide in the present invention composition along with the iron oxide did not lead to increased solarization. Solarization is the result of reactions that occur in glass when exposed to UV radiation such as that in sunlight. One such reaction is the shift of $Fe^{+3}$ towards $Fe^{+2}$. Solarization causes the iron to move from the oxidized species to the reduced species which also causes an undesirable color shift in the glass product. This problem of solarization is also discussed by Milos B. Volf in *Chemical Approach to Glass*, Elsevier Science Publishing Co., Inc., 1984, p. 343. "Manganese as a decolorizer has the disadvantage of creating solarization and of being sensitive to the furnace atmosphere."

Generally, gray colored heat absorbing glasses relied, in the past, on the inclusion of nickel oxide as an active coloring agent. Nickel compounds, however, are known to react with other materials in soda-lime-silica glass and form nickel sulfide "stones" in the glass. These stones are usually small, thereby avoiding detection methods, but can produce an unacceptably high rate of breakage during tempering of the glass. U.S. Pat. No. 5,023,210 to Krumwiede et al. discloses the use of chrome oxide in combination with iron oxide, cobalt oxide and selenium to achieve a dark gray glass without nickel. It does not include $MnO_2$.

SUMMARY OF THE INVENTION

The present invention is a soda-lime-silica glass composition that is heat absorbing with a neutral gray color and improved selenium retention. The composition in its broadest embodiment comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, with traces of melting and refining aids, if any, and colorants consisting essentially of: 0.90 to 1.90 wt. % total iron oxide as $Fe_2O_3$; 0.002 to 0.025 wt. % cobalt as Co; 0.0010 to 0.0060 wt. % selenium as Se; 0.10 to 1.0 wt. % manganese oxide as $MnO_2$; and 0.0 to 1.0% titanium oxide as $TiO_2$.

Glass products made according to embodiments of the invention have the following spectral properties at 4mm thickness: 10.0 to 55.0% light transmittance using illuminant A (LTA), less than 25.0% ultra violet transmittance, and less than 50.0% infra red transmittance. Preferably, the composition has a dominant wavelength between about 470 and 590 nanometers. Generally, as the quantities of the colorants increase, the % transmittance will go down. Similarly, generally as the glass thickness increases for a given glass composition, the transmittance of the thicker glass will decrease.

We have unexpectedly discovered that introducing manganese oxide in the batch increases the retention of selenium in the glass product over and above that obtained by incorporating nitrates. While the major function of the manganese oxide is to increase the selenium retention, there is some absorption by manganese oxide in the same portion of the visible spectrum as the selenium component, hence incorporation of manganese oxide also further enhances the grey color. Thus, less of the costly selenium is necessary to be present in the composition since the manganese oxide in effect also acts to provide the grey color. Desirably, the glass composition of this invention has a gray color which is obtained without the addition of nickel.

DETAILED DESCRIPTION OF THE INVENTION

Flat soda-lime-silica glass, used in the automotive and architectural industries and conveniently made by the float glass process, is generally characterized by the following basic composition shown in Table I, the amounts of the components being based on a weight percentage of the total glass composition:

TABLE I

| Oxide Component | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The neutral gray glass composition of the present invention employs this basic soda-lime-silica glass composition wherein, additionally, CaO+MgO is 6 to 15% and $Na_2O+$ $K_2O$ is 10 to 20%. Preferably $SO_3$ is 0.10 to 0.30 wt. %, more preferably 0.14 to 0.25 wt. %. In addition, the neutral gray glass composition consists essentially of the following coloring components: iron oxide; cobalt oxide; selenium; manganese oxide; and optionally titanium dioxide as summarized above.

The total iron oxide as $Fe_2O_3$ is present in the invention composition in quantities of 0.9 to 1.90 weight %. All weight percents disclosed herein are based on the total weight of the invention glass composition. Typically, this ingredient is added into the batch ingredients in oxide form, e.g., $Fe_2O_3$. The iron oxide incorporated in the composition lowers both the ultra violet and the infra red transmittance of the glass products. More particularly, the iron oxide performs two functions in this glass system: (1) the oxidized form of iron oxide ($Fe_2O_3$) absorbs in the ultra violet portion of the spectrum providing low ultra violet transmittance, and (2) the reduced form of iron oxide (FeO) absorbs in the infra red portion of the spectrum and the resultant glass thus has a lowered infra red transmittance. Both absorbing functions of the iron oxide are especially valuable when the glass product is used in automobiles. When heat is absorbed by the glass, the load on air conditioners is initially reduced and there is less total heat in the vehicle to cool.

Cobalt, which is typically added to the batch ingredients as an oxide thereof, is present as a coloring component in the invention glass composition in an amount of 0.002 to 0.025 wt. % as Co, the cobalt functioning to absorb light from about 580 to 680 nanometers in the visible portion of the spectrum. Selenium, which is typically added to the batch ingredients as a metal, is present as a coloring component in an amount of 0.0010 to 0.0060 wt. % Se, the selenium functioning to absorb light from about 430 to 540 nanometers of the visible spectrum. It is necessary to balance the amount of absorption from selenium with that of cobalt to achieve a neutral gray appearance.

Manganese oxide is present in the grey glass invention composition in an amount of 0.10 to 1.0 wt % based on $MnO_2$. Manganese oxide can be added to the batch glass components in a variety of forms, e.g., $MnO_2$, $MnO_4$, MnO, etc. In the glass composition, it is generally present in the $Mn^{+2}$ and $Mn^{+3}$ state, although it may additionally be present in other states such as $Mn^{+4}$. There are two functions that manganese oxide performs in the present invention composition: (1) one form of manganese in the glass absorbs in the same area as selenium so that it replaces a portion of the selenium, and (2) manganese oxide acts as an oxidizer and helps to retain a larger proportion of selenium from the batch. Typically, in compositions without manganese oxide, a large amount of selenium (about 85–90%) which is very costly volatilizes from the batch even when using sodium or potassium nitrates as oxidizers. Therefore, our finding that manganese oxide is extremely beneficial in retaining a higher proportion in the final glass product of the selenium added into the batch (~300% increased selenium retention) was unexpected and is a critical point of this invention. As discussed above and in more detail below, unexpectedly we have also found that contrary to prior teachings, including manganese oxide along with iron oxide in the glass composition did not cause any appreciable solarization (discoloring) after exposure to ultra-violet light. We have discovered that employing manganese oxide along with iron oxide in amounts as specified in this invention composition, allows the solarization phenomena to be minimized.

Titanium dioxide may optionally be used in the present invention neutral gray glass composition to enhance achievement of a particular range of dominant wavelength to the glass composition. Gray glasses of this invention are preferably those with an excitation purity of less than about 5.5%. It is important that the present invention glass product be a neutral gray, more specifically being a green gray; preferably the dominant wavelength with illuminant C is between 470 and 590 nanometers (nm), more preferably between 480 and 570 nm, most preferably between 487.5 and 558nm, using the C.I.E. convention with a 2° observer. Titanium dioxide is very useful in shifting the dominant wavelength within the range of 470 to 590 nanometers. Titanium dioxide also absorbs in the ultra violet range of the spectral curve and helps to lower the ultra violet transmittance of glass in this invention.

We have found that glasses within the broadest scope of this invention have the following spectral properties when measured at a control thickness of 4.0 millimeters: light transmittance with illuminant A (LTA) between 10.0% and 55.0%, ultra violet transmittance of less than 25.0%, preferably less than about 10.0% when the glass has less than 35.0% LTA, and infra red transmittance is less than about 50.0%. As would be apparent to those skilled in the art in view of the present disclosure, the glass composition of this invention may also be made into glass at other thicknesses. Generally, although not meant to be so limited, the thickness for the glass product would be within the range of 2.0 to 12.0 millimeters which is typical of glass produced by the float process.

Table II discloses the amounts of raw material batch ingredients which are preferably used to form embodiments of neutral gray glass compositions according to the present invention.

TABLE II

| BATCH MATERIAL | RANGE MASS (LBS.) |
| --- | --- |
| Sand | 1000 |
| Soda Ash | 290 to 320 |
| Dolomite | 215 to 260 |
| Limestone | 75 to 90 |
| Salt Cake | 6 to 24 |
| Rouge (97% $Fe_2O_3$) | 17 to 23 |
| Titanium Dioxide | 0 to 5 |
| Sodium Nitrate | 3 to 20 |
| Manganese Dioxide | 2 to 8 |
| Carbocite (70% C) | 0.1 to 1.5 |
| Cobalt Oxide ($Co_3O_4$) | 0.30 to 0.36 |
| Selenium | 0.20 to 0.70 |

As would be appreciated by those skilled in the art, processing aids are generally added to the glass batch during the melting and processing, e.g., to maintain the proper balance of redox conditions or as fining agents. For example, carbocite (anthracite coal) when added to the glass composition has the effect of reducing a portion of the $Fe_2O_3$ to FeO to achieve lower infra red transmittance. Sodium and/or potassium nitrate are used in glass batches of the invention to maintain oxidizing conditions early in the melting process which aids in selenium retention. Nitrates have been used by others to improve selenium retention. Careful balance must be maintained between the reducing conditions from the carbocite and the oxidizing conditions from the nitrates and manganese dioxide used to improve selenium retention in the glass, because the oxidizers also act upon the iron oxide to shift the redox from FeO toward $Fe_2O_3$ while carbocite shifts the iron oxide equilibrium in the opposite direction. As disclosed above, we have discovered that employing manganese oxide along with iron oxide in the amounts specified for the invention composition, allows the solarization phenomena to be minimized. The quantities of salt cake, carbocite and sodium nitrate preferably used in the batch ingredients to achieve the desired ratio between the two iron oxides in the final composition also helps to retard solarization in the invention glass. More preferably, the lbs. of batch materials: salt cake; sodium nitrate; carbocite is 8–18; 5–15; 0.3–1.0, and most preferably are: 8–12; 5–10; 0.3–1.0, respectively per 1000 lbs. of sand. These disclosed most preferred amounts of the three batch materials is associated with a final glass product preferably having 0.15–0.60 wt. % $MnO_2$ and 1.2–1.6 wt. % total iron as $Fe_2O_3$ in the final glass composition.

In order to show the unexpected effects of manganese dioxide on improving selenium retention in our glass composition, eight grey glass compositions were made as described below in Tables III and IV. Neutral gray glass compositions made according to embodiments of this invention were detailed as Examples 1–4. For comparison, similar glass compositions except without manganese dioxide were made as detailed as Examples 5–8. All of these glasses were made by the following procedure. The batches were weighed (typically 170 grams total) on a laboratory balance and mixed within a jar for 10 minutes each using a laboratory shaker. Each mixed batch was placed into a platinum-rhodium crucible which was about 2" tall with about a 2.5" inside diameter and 4.5 ml. of water was mechanically mixed into the raw batch. Crucibles were placed into a natural gas/air furnace pre-heated to 2600° F. with 3 to 5 other crucibles. Furnace temperature recovers to 2600° F. in about 30 minutes. After two hours melting, each crucible was removed in turn, glass in the crucible was fritted by quenching in cold water, and the fragments were mixed in the crucible and all crucibles were returned to the furnace. Furnace temperature was brought back to 2600° F. and the fritting procedure was repeated as in the step above once the operating temperature was attained, about 45 minutes. All glass samples were melted for another 3 hours and each sample was poured into a 2.5" inside diameter graphite mold to shape the glass samples for subsequent grinding and polishing. All samples were placed into an annealing furnace, brought up to 1050° F., held for 4 hours, then allowed to slowly cool to room temperature in about 16 hours. Samples were ground and polished and spectral properties were measured on each sample; spectral properties were calibrated to a control thickness of 4 mm. Samples were then chemically analyzed via X-ray fluorescence or other tests conducted as needed.

TABLE III

|  | Example 1 | Example 2 | Example 3 | Example 4 |
| --- | --- | --- | --- | --- |
| Sand | 100.00 | 100.00 | 100.00 | 100.00 |
| Soda Ash | 31.41 | 31.41 | 31.41 | 31.41 |
| Limestone | 7.25 | 7.25 | 7.25 | 7.25 |
| Dolomite | 25.83 | 25.83 | 25.83 | 25.83 |
| Salt Cake | 1.0956 | 1.0960 | 1.0969 | 1.0969 |
| Sodium Nitrate | 0.5215 | 0.5192 | 0.5233 | 0.5236 |
| Rouge | 1.8133 | 2.1103 | 1.9683 | 2.1061 |
| Carbocite | 0.0916 | 0.0914 | 0.0916 | 0.0907 |
| Cobalt Oxide | 0.0142 | 0.0313 | 0.0370 | 0.0392 |
| Manganese Dioxide | 0.5304 | 0.8107 | 1.3750 | 0.5315 |
| Selenium | 0.0209 | 0.0490 | 0.0430 | 0.0577 |
| ppm Selenium in Glass | 26 | 75 | 70 | 80 |
| % Selenium Retained | 17.1 | 21.0 | 22.3 | 19.0 |

Present invention compositions of Examples 1–4 show amounts of retained selenium of between 17.1 and 22.3%. In contrast, comparative Examples 5–8 below, not according to this invention (i.e., not including $MnO_2$) show amounts of retained selenium of only between 6.2 and 7.8%. These examples show an almost 300% increase in selenium retention when manganese dioxide is employed along with the selenium as in the present invention compositions.

TABLE IV

|  | Example 5 | Example 6 | Example 7 | Example 8 |
| --- | --- | --- | --- | --- |
| Sand | 100.00 | 100.00 | 100.00 | 100.00 |
| Soda Ash | 31.41 | 31.41 | 31.41 | 31.41 |
| Limestone | 7.25 | 7.25 | 7.25 | 7.25 |
| Dolomite | 25.83 | 25.83 | 25.83 | 25.83 |
| Salt Cake | 1.0961 | 1.0960 | 1.0960 | 1.0958 |
| Sodium Nitrate | 0.5187 | 0.5234 | 0.5220 | 0.5188 |
| Rouge | 2.1078 | 1.8144 | 2.1105 | 2.1051 |
| Carbocite | 0.0912 | 0.0913 | 0.0912 | 0.0917 |
| Cobalt Oxide | 0.0165 | 0.0144 | 0.0317 | 0.0389 |
| Selenium | 0.0286 | 0.0414 | 0.0963 | 0.1116 |
| ppm Selenium in Glass | 8 | 10 | 22 | 28 |
| % Selenium Retained | 7.8 | 6.5 | 6.2 | 6.2 |

Table V below lists the preferred ranges of resultant oxide constituents of our new glass composition. Following the table are the spectral properties of such preferred glass compositions according to the invention.

TABLE V

| Oxide Component | Weight % |
| --- | --- |
| $SiO_2$ | 71 to 74 |
| $Al_2O_3$ | 0.15 to 0.25 |
| $Fe_2O_3$ | 1.20 to 1.60 |
| CaO | 8.40 to 8.70 |
| MgO | 3.5 to 4.00 |
| $Na_2O$ | 13.00 to 13.80 |
| $K_2O$ | 0 to 0.10 |
| $TiO_2$ | 0.00 to 0.35 |
| $MnO_2$ | 0.15 to 0.6 |
| $SO_3$ | 0.14 to 0.25 |
| Co (metal) | 0.0160 to 0.0185 |
| Se (metal) | 0.0020 to 0.0040 |

| Preferred Glass Property Ranges (4 mm. thick glass sheet) | |
| --- | --- |
| Visible Transmission (Ill. A): | 16–20% |
| Ultraviolet Transmission: | 5–10% |
| Infrared Transmission: | 10–18% |
| Total Solar Transmission: | 12–20% |
| Dominant Wavelength: | 470–590 nm |
| Excitation Purity: | 0.0–5.5% |
| FeO/Total Iron Oxide as $Fe_2O_3$ Ratio: | 0.18–0.26 |

Examples of the amounts of raw materials used to make various preferred embodiments of neutral gray glass compositions according to the present invention were set out in Table VI below. The table also details the spectral properties of the resulting glasses:

TABLE VI

|  | Example 9 | Example 10 | Example 11 | Example 12 | Example 13 |
| --- | --- | --- | --- | --- | --- |
| Sand | 100.00 | 100.00 | 100.00 | 100.00 | 100.00 |
| Soda Ash | 31.41 | 31.41 | 31.41 | 31.41 | 31.41 |
| Limestone | 7.25 | 7.25 | 7.25 | 7.25 | 7.25 |
| Dolomite | 25.83 | 25.83 | 25.83 | 25.83 | 25.83 |

TABLE VI-continued

| | Example 9 | Example 10 | Example 11 | Example 12 | Example 13 |
|---|---|---|---|---|---|
| Salt Cake | 1.0966 | 1.0959 | 1.0960 | 1.0960 | 1.0961 |
| Sodium Nitrate | 0.5198 | 0.5200 | 0.5205 | 0.5207 | 0.5204 |
| Rouge | 2.0996 | 2.1008 | 2.1012 | 2.1010 | 2.1142 |
| Carbocite | 0.0913 | 0.0910 | 0.0915 | 0.0914 | 0.0913 |
| Cobalt Oxide | 0.0300 | 0.0308 | 0.0298 | 0.0305 | 0.0305 |
| Manganese Dioxide | 0.1384 | 0.2705 | 0.2800 | 0.2802 | 0.5601 |
| Selenium | 0.0550 | 0.0411 | 0.0418 | 0.0415 | 0.0281 |
| Titanium Dioxide | 0.0 | 0.0 | 0.0 | 0.0 | 0.5601 |
| % LTA | 18.3 | 18.8 | 17.9 | 19.8 | 19.5 |
| % UV | 7.5 | 7.4 | 6.6 | 8.2 | 6.0 |
| % IR | 15.7 | 15.6 | 15.2 | 15.0 | 13.1 |
| % TSET | 16.7 | 16.8 | 16.1 | 16.9 | 15.5 |
| Dominant Wavelength | 559.8 | 514.3 | 463.7 | 493.9 | 505.5 |
| Excitation Purity, % | 3.3 | 1.3 | 5.1 | 3.8 | 3.2 |

As used through the disclosure of this invention and in Table VI above, % LTA is defined to be the % luminous transmittance measured under CIE standard illuminant A. As used herein, the % UV is the % ultra violet transmittance as measured between 280 and 400 nonometers while the % IR is the % infra red transmittance measured over the range of 720 to 2120 nanometers. The % TSET is the % total solar energy transmittance as defined in U.S. Pat. No. 4,792,536 by the equation:

$$\%TSET = 0.44\ \%LTA + 0.53\ \%IR + 0.03\ \%UV$$

The dominant wavelength and % excitation purity are measured using CIE standard illuminant C.

As discussed herein, glasses containing manganese and iron oxides have been known to solarize or discolor when exposed to a strong ultra violet light source. For example, the Jones patent discussed above teaches that glass containing iron oxide and $MnO_2$ is undesirable because the $MnO_2$ causes a brown coloration after UV exposure. In contrast, the glasses of the present invention having the particular set of redox conditions within the scope of this invention, and specifically disclosed in detail above, have been found not to experience any appreciable solarization. Table VII below shows this. Embodiments of the invention glass according to this invention exhibit only a modest change of the color after an accelerated 3 month exposure in an Atlas, Model Ci65 Weather-ometer using a Xenon UV lamp. This 3 month exposure in the Atlas Weather-ometer is considered equivalent to over 4 years exposure to the sun in Arizona.

TABLE VII

| | Original | Exposed 3 Months | Difference |
|---|---|---|---|
| Example 14-lab melt-no Mn nor Ti | Dominant Wavelength 483.0 | Dominant Wavelength 483.2 | +0.2 |
| Example 15-lab melt-0.2% $TiO_2$ | Dominant Wavelength 493.2 | Dominant Wavelength 494.2 | +1.0 |
| Example 16-lab melt-0.2% $MnO_2$ | Dominant Wavelength 568.6 | Dominant Wavelength 570.2 | +1.6 |
| Example 17-lab melt-0.4% $MnO_2$ | Dominant Wavelength 557.0 | Dominant Wavelength 558.4 | +1.4 |
| Example 14-lab melt-no Mn nor Ti | % Excitation Purity 5.7 | % Excitation Purity 5.4 | −0.3 |
| Example 15-lab melt-0.2% $TiO_2$ | % Excitation Purity 2.9 | % Excitation Purity 2.6 | −0.3 |
| Example 16-lab melt-0.2% $MnO_2$ | % Excitation Purity 5.1 | % Excitation Purity 5.7 | +0.6 |
| Example 17-lab melt-0.4%- $MnO_2$ | % Excitation Purity 3.9 | % Excitation Purity 3.9 | 0.0 |

The scope of this invention includes not only glasses with low transmitance but other glasses that have a relatively high LTA which are heat absorbing and have a neutral gray green color. Exemplary of such glasses are those detailed in examples 18 and 19 in Table VIII below:

TABLE VIII

| | Example 18 | Example 19 |
|---|---|---|
| Sand | 100.00 | 100.00 |
| Soda Ash | 31.41 | 31.41 |
| Limestone | 7.25 | 7.25 |
| Dolomite | 25.83 | 25.83 |
| Salt Cake | 1.0960 | 1.0961 |
| Sodium Nitrate | 0.5204 | 0.5205 |
| Rouge | 1.3630 | 1.3630 |
| Carbocite | 0.0912 | 0.0913 |
| Cobalt Oxide | 0.0057 | 0.0095 |
| Manganese Dioxide | 0.2779 | 0.2779 |
| Selenium | 0.0280 | 0.0210 |
| % LTA | 53.2 | 48.7 |
| % UV | 23.9 | 23.4 |
| % IR | 26.4 | 26.6 |
| % TSET | 36.0 | 34.8 |
| Dominant Wavelength | 554.5 | 512.1 |
| Excitation Purity, % | 4.3 | 1.8 |

Table VIII above demonstrates glasses made within the scope of this invention which shows the sensitivity of the balance that must be maintained between the cobalt and the selenium. A small increase in cobalt and less selenium moves the dominant wavelength of Example 18 toward a green color as in Example 19; the excitation purity also is lowered from the cobalt and selenium adjustments made in Example 18 to Example 19.

We claim:

1. A process for retarding the volatilization of selenium used as a colorant in preparing a neutral grey glass composition by including a manganese containing compound along with the selenium during melt processing of the glass composition, said process comprising the steps of:

admixing and melting together sand, soda ash, dolomite, limestone, salt cake, rouge, sodium nitrate, a manganese containing compound, carbocite, a cobalt containing compound, and selenium, in quantities sufficient to form said neutral grey glass composition having a base glass composition comprising by weight: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants consisting essentially of: 0.90 to 1.90 wt. % total iron oxide as $Fe_2O_3$; 0.002 to 0.025 wt. % cobalt as Co; 0.0010 to 0.0060 wt. % selenium as Se; 0.10 to 1.0 wt. % manganese oxide as $MnO_2$; and 0.0 to 1.0% titanium oxide as $TiO_2$, said neutral grey glass composition having at 4 mm. control thickness a light transmittance using illuminant A of 10.0% to 55.0%, ultra violet transmittance less than 25.0%, and infra red transmittance less than about 50.0%.

2. The process according to claim 1, wherein based on 1000 lbs. of said sand used to make said composition, the batch ingredients comprise: 6–24 lbs. salt cake; 3–20 lbs. sodium nitrate; and 0.1–1.5 lbs. carbocite.

3. The process according to claim 2, wherein said batch ingredients comprise 8–18 lbs. salt cake; 5–15 lbs. sodium nitrate; and 0.3–1.0 lbs carbocite.

4. The process according to claim 3, wherein said batch ingredients comprise 8–12 lbs. salt cake; 5–10 lbs. sodium nitrate; 0.3–1.0 lbs. carbocite; and said neutral grey glass composition comprises 0.15–0.60 $MnO_2$ and 1.2–1.6 wt. % total iron as $Fe_2O_3$.

5. The process according to claim 1, wherein the FeO/total iron oxide as $Fe_2O_3$ is between 0.18 and 0.26.

6. The process the according to claim 1, wherein the dominant wavelength is between 470 and 590 nanometers.

7. The process according to claim 1, wherein $SO_3$ is present in the composition in an amount between about 0.1 and 0.3 wt. %.

8. The process according to claim 1, wherein the excitation purity of said glass is less than about 5.5%.

9. A process for retarding the volatilization of selenium used as a colorant in preparing a neutral grey glass composition by including a manganese containing compound along with the selenium during melt processing of the glass composition, the process comprising the steps of:

admixing and melting together sand, soda ash, dolomite, limestone, salt cake, rouge, sodium nitrate, a manganese containing compound, carbocite, a cobalt containing compound, and selenium, in quantities sufficient to form said neutral gray colored glass composition having a base glass composition comprising by weight: 71 to 74% $SiO_2$, 13 to 13.80% $Na_2O$, 8.4 to 8.7% CaO, 3.5 to 4% MgO, 0.15 to 0.25% $Al_2O_3$, and 0 to 0.1% $K_2O$, where CaO+MgO is 6 to 15% and $Na_2O+K_2O$ is 10 to 20%, and colorants consisting essentially of: 1.20 to 1.60 wt. % total iron oxide as $Fe_2O_3$; 0.0160 to 0.0185 wt. % cobalt as Co; 0.0020 to 0.0040 wt % selenium as Se; 0.15 to 0.60 wt. % manganese oxide as $MnO_2$; and 0.0 to 0.35 wt. % titanium oxide as $TiO_2$, the glass at 4 mm. control thickness having light transmittance using illuminant A between 16.0% and 20.0%, ultra violet transmittance between 5 and 10 %, infra red transmittance between 10 and 18 %, and a dominant wavelength between about 470 and 590 nanometers.

10. The process according to claim 9, wherein based on 1000 lbs. of said sand used to make said composition, the batch ingredients comprises: 6–24 lbs. salt cake; 3–20 lbs. sodium nitrate; and 0.1–1.5 lbs. carbocite.

11. The process according to claim 10, wherein said batch ingredients comprise 8–18 lbs salt cake; 5–15 lbs. sodium nitrate; and 0.3–1.0 lbs carbocite.

12. The process according to claim 11, wherein said batch ingredients comprise 8–12 lbs. salt cake; 5–10 lbs. sodium nitrate; 0.3–1.0 lbs. carbocite; and said neutral grey glass composition comprises 0.15–0.60 $MnO_2$ and 1.2–1.6 wt. % total iron as $Fe_2O_3$.

13. The process according to claim 9, wherein the FeO/total iron oxide as $Fe_2O_3$ is between 0.18 and 0.26.

14. The process according to claim 9, wherein the excitation purity of said glass is less than about 5.5%.

* * * * *